UNITED STATES PATENT OFFICE.

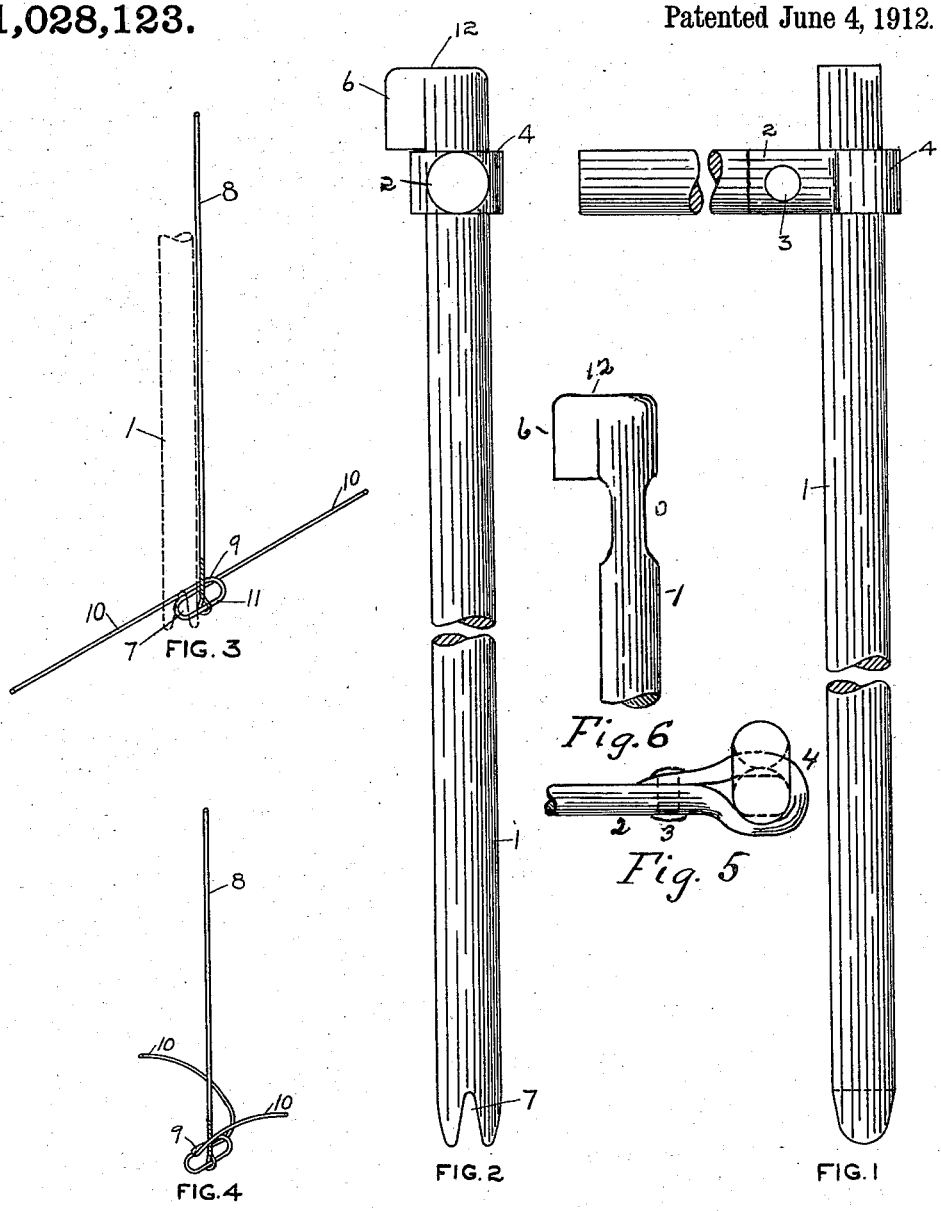

JOHN A. McGREEVEY, OF DELPHI, INDIANA.

DRIVEN WRENCH.

1,028,123.  Specification of Letters Patent.  Patented June 4, 1912.

Application filed November 13, 1911. Serial No. 660,141.

*To all whom it may concern:*

Be it known that I, JOHN A. MCGREEVEY, a citizen of the United States, residing at Delphi, Carroll county, Indiana, have invented a new, useful, and indispensable Driven Wrench Adapted for Use in Land-Anchoring, of which the following is a specification.

My invention relates to land-anchoring and is the means or tool for driving the anchor into the ground to any desired depth then twisting it in such manner as to have it securely fastened, thus making the anchors to posts, poles, etc., more difficult to be displaced than if they were merely driven into the ground and not twisted in this manner.

The prime object of my invention is to provide a driven-wrench adapted for all purposes for which my "driver-rod" and wrench, for which I obtained Letters Patent, numbered 991,525 for land-anchoring, bearing date of May 9, 1911, was presumed to serve, and especially to prevent the injurious effects of the rigorous vibrations of the handle on that "driver-rod".

My invention will be more clearly understood from the accompanying illustrations, in which—

Figure 1 shows a full side view in perspective, showing the driven-wrench complete in form and indicating how the sleeve portion of the handle, being slightly flattened around the top portion of the driver-rod, works loosely thereon, as is more clearly shown in Fig. 5. Fig. 2 shows an end view of the handle, the driver-rod bent at its top so as to fit closely against the rod above the handle forming a head on which the driven-wrench is driven, and also, shows the groove in the sharp end of the rod in which the cable to be driven into the ground is held securely in place until it has been twisted as required and then released from the rod, as shown in Fig. 6. Fig. 3 shows the relative shapes and positions of the three parts, respectively, "the driver-rod, the looped center of the cable supports and the aboveground cable wire attached thereto." Fig. 4 shows the cable presumed to be in the ground and twisted one-fourth of a full turn of the "driver-rod". Fig. 5 shows the handle. Fig. 6 shows the flattened position of the "driver-rod" about which the handle loops.

Similar numerals refer to similar parts throughout the several views as illustrated.

In Fig. 1, 1 is the driver-rod, 2 the handle thereon, which handle is made of one piece of metal formed to loop at 4, around the driver-rod and is riveted to itself at 3, as shown.

In Fig. 2, 6 shows that portion of the top of driver-rod which has been bent over and downwardly against the rod closely for the purpose of forming a less vibratory head 12, upon which the driver-rod is driven with sledge, hammer, maul, etc., and shows the groove or jaws between which the looped portion of the cable 8, is engaged at 9, the extended portions 10 and the engagement of the guy wire or cable 8 at 11 all of which as shown in Fig. 3, and in which relative positions the anchorage is ready to be driven by the driven-wrench to the desired depth in the ground.

Fig. 4 shows the form the cable supports 10 assume after having been driven into place and twisted by the driven-wrench into this form as hereinbefore described.

I have herein referred to Figs. 3 and 4 as illustrations in my former patent as hereinbefore mentioned, but do not claim any part of them as part of this invention.

My driven-wrench is operated as follows:—The looped cable is formed with its projecting ends as supports, the guy wire or aboveground wire is fastened to the cable loop, the loop is placed within the jaws of the sharp end of the driver-rod, the driven wrench is then driven to the desired depth into the ground, then by the handle is twisted one-fourth of one full turn of the driver-rod, and the driven-wrench removed.

This form and construction of handle permits the operator to direct the course of the cable being driven to any desired angle, and eliminates the rigorous vibrations of the handle as constructed in my former patent in and to the degree that this handle is easily held while the driven-wrench is being driven, whereas the handle in my former patent made it unbearable to the hand when the cable was being placed in the ground. Experience shows that no construction of a handle, save this invention, is practicable for this purpose.

Having thus fully described my invention, what I claim and desire to protect by Letters Patent of the United States, is—

A driven-wrench of the class described comprised of a driver-rod grooved in its sharp end, said groove adapted to carry between its jaws and against its base, wire cables designed to be driven into the ground and twisted therein, said driver-rod provided with a loosely fitting handle as especial means of eliminating the effects of severe vibrations, said driver-rod having a portion at its top end flattened and a further top portion bent to fit downwardly rigidly against itself forming a head upon which the driven-wrench is driven substantially as described and for the purposes set forth.

In testimony whereof I have hereunto subscribed my name in the presence of two subscribing witnesses.

JOHN A. McGREEVEY.

Witnesses:
CHARLES McCRARY,
JOHN T. SINES.

Copies of this patent may be obtained for five cents each, by addressing the "Commissioner of Patents. Washington, D. C."